US010255393B2

(12) United States Patent
Webber et al.

(10) Patent No.: US 10,255,393 B2
(45) Date of Patent: Apr. 9, 2019

(54) OPTIMALLY PLACING PHOTOVOLTAIC ARRAYS TO MAXIMIZE VALUE OF ENERGY PRODUCTION BASED ON PEAK POWER PRODUCTION, LOCAL SOLAR RADIATION, WEATHER, ELECTRICITY MARKET PRICES AND RATE STRUCTURES

(71) Applicant: Board of Regents, The University of Texas System, Austin, TX (US)

(72) Inventors: Michael E. Webber, Austin, TX (US); Joshua D. Rhodes, Austin, TX (US); Charles R. Upshaw, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 655 days.

(21) Appl. No.: 14/724,276

(22) Filed: May 28, 2015

(65) Prior Publication Data
US 2015/0372641 A1 Dec. 24, 2015

Related U.S. Application Data

(60) Provisional application No. 62/014,842, filed on Jun. 20, 2014.

(51) Int. Cl.
*G06F 17/50* (2006.01)
*H02S 10/00* (2014.01)

(52) U.S. Cl.
CPC ...... *G06F 17/5018* (2013.01); *G06F 17/5004* (2013.01); *H02S 10/00* (2013.01);
(Continued)

(58) Field of Classification Search
CPC ............ G06F 17/5018; G06F 17/5004; G06F 2217/78; H02S 10/00; Y02E 60/76; Y02E 40/76; Y02E 10/50; Y04S 40/22; Y04S 10/545
See application file for complete search history.

(56) References Cited

U.S. PATENT DOCUMENTS

2009/0159113 A1* 6/2009 Morimoto ............. F24J 2/38
136/244
2011/0276269 A1 11/2011 Hummel
(Continued)

OTHER PUBLICATIONS

PVWatts Version 1 Technical Reference, Aron P. Dobos, National Renewable Energy Laboratory, Technical Report NREL/TP-6A20-60272, Sep. 10, 2013 (Year: 2013).*
(Continued)

*Primary Examiner* — Aniss Chad
*Assistant Examiner* — Steven W Crabb
(74) *Attorney, Agent, or Firm* — Robert A. Voigt, Jr.; Winstead, P.C.

(57) ABSTRACT

A method, system and computer program product for optimally placing photovoltaic arrays to maximize a value of energy production. Incident solar radiation for various placements of the photovoltaic arrays accommodating different azimuths and tilts is calculated. Alternating current solar photovoltaic electricity energy and power production is then estimated from the calculated solar radiation on a plane and weather data. Furthermore, a value of solar photovoltaic electricity energy and power produced by the photovoltaic arrays for the various placements is calculating using the estimated alternating current solar photovoltaic electricity production. A placement out of the various placements for the photovoltaic arrays is then selected corresponding to a highest value of the solar photovoltaic electricity produced by the photovoltaic arrays. In this manner, the appropriate placement for the photovoltaic arrays is determined that maximizes the value of energy production (where "value" may correspond to an economic value or a non-economic value).

15 Claims, 15 Drawing Sheets

(52) U.S. Cl.
CPC .......... *G06F 2217/78* (2013.01); *Y02E 10/50* (2013.01); *Y02E 40/76* (2013.01); *Y02E 60/76* (2013.01); *Y04S 10/545* (2013.01); *Y04S 40/22* (2013.01)

(56) References Cited

U.S. PATENT DOCUMENTS

| | | | |
|---|---|---|---|
| 2013/0068284 | A1 | 3/2013 | Beardsworth et al. |
| 2013/0158954 | A1* | 6/2013 | Wayne .................... G06F 17/50 703/1 |
| 2013/0249297 | A1* | 9/2013 | Takehara ................. H02J 1/00 307/71 |
| 2014/0067332 | A1* | 3/2014 | Chen .................. G06F 17/5004 703/1 |
| 2014/0200717 | A1 | 7/2014 | Tilley et al. |
| 2014/0379311 | A1* | 12/2014 | Matsue ............... G06F 17/5004 703/2 |

OTHER PUBLICATIONS

International Preliminary Report on Patentability for International Application No. PCT/US2015/032947 dated Dec. 20, 2016, pp. 1-6.

Written Opinion for International Application No. PCT/US15/32947 dated Sep. 3, 2015, pp. 1-7.

Oscar Perpinan Lamigueiro, Solar Radiation and Photovoltaic Systems with R, Journal of Statistical Software, vol. 50, Issue 9, 2012, pp. 1-32.

Hay et al., "Estimating Solar Irradiance on Inclined Surfaces: A Review and Assessment of Methodologies," International Journal of Solar Energy, vol. 3, Issue 4, 1985, pp. 203-210.

Reindl et al., "Evaluation of Hourly tilted Surface Radiation Models," Solar Energy, vol. 45, Issue 1, 1990, pp. 9-17.

Skoplaki et al., "On the Temperature Dependence of Photovoltaic Module Electrical Performance: A Review of Efficiency/Power Correlations," Solar Energy, vol. 83, Issue 5, 2009, pp. 614-624.

Byrd et al., "A Limited Memory Algorithm for Bound Constrained Optimization," SIAM Journal of Scientific Computing, vol. 16, Issue 5, 1995, pp. 1190-1208.

Nocedal et al., Numerical Optimization, 2nd Edition, New York: Springer, 2006, pp. 1-664, see pp. 24, 136, 149-152 and 273-302.

Rhodes et al., "A Multi-Objective assessment of the Effect of Solar PV Array Orientation and Tilt on Energy Production and System Economics," Solar Energy, 108, 2014, pp. 28-40.

* cited by examiner

TABLE 1

| RADIATION INPUTS | WEATHER INPUTS | PRICING DATA | OPTIMAL PLACEMENT | UNITS | OPTIMAL VALUE | VALUE AT 180°/30° | PERCENT CHANGE | FIGURE REFERENCE |
|---|---|---|---|---|---|---|---|---|
| CLEAR SKY | TMY | - | 180°/30° | kWh/m²/yr | 245.8 | 245.8 | 0.0 | FIGURE 4 |
| TMY | TMY | - | 188°/28° | kWh/m²/yr | 156.3 | 156.0 | 0.2 | FIGURE 5 |
| MEASURED | MEASURED | ERCOT AUCT | 204°/25° | $/m²/yr | 5.94 | 5.85 | 1.6 | FIGURE 6 |
| TMY | TMY | ERCOT AVG | 219°/29° | $/m²/yr | 7.97 | 7.67 | 3.9 | FIGURE 7 |
| TMY | TMY | AE TOU Rate* | 200°/25° | $/m²/yr | 11.07 | 10.96 | 1.0 | FIGURE 8 |
| TMY | TMY | ERCOT 2011 | 231°/30° | $/m²/yr | 10.24 | 9.58 | 7.0 | FIGURE 9 |

*AUSTIN ENERGY RESIDENTIAL TIME-OF-USE RATE

FIG. 3

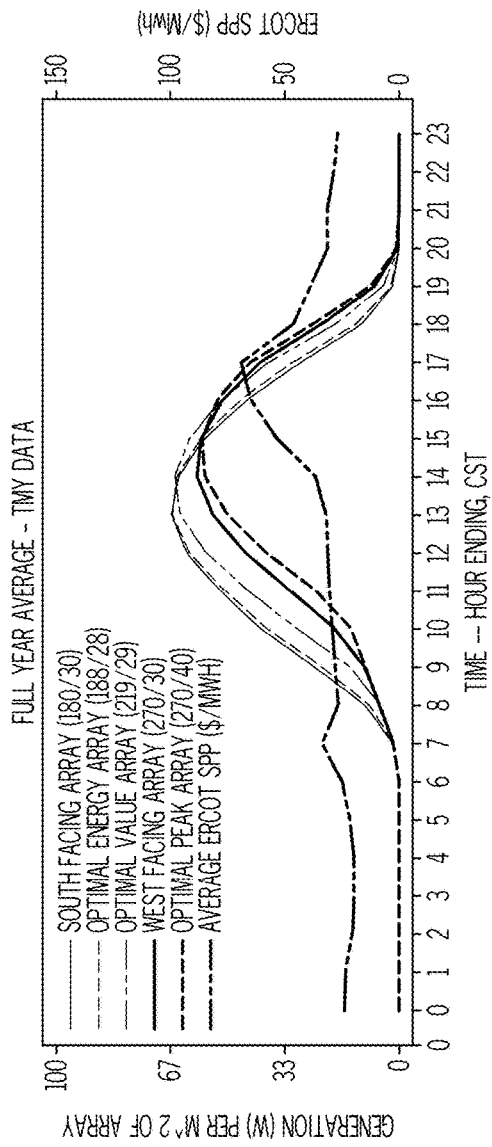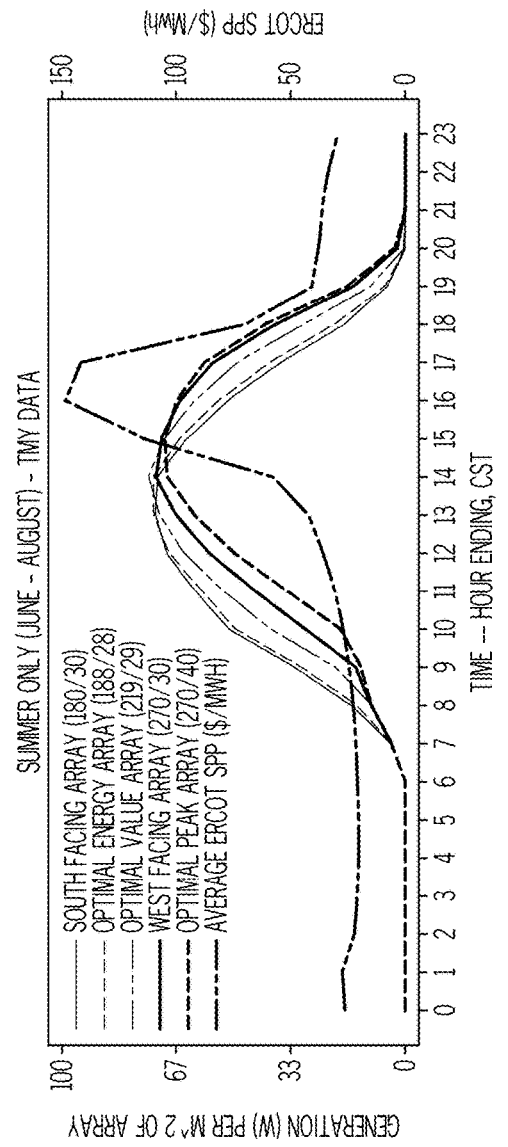

TABLE 2

| PLACEMENT | FULL YEAR | SUMMER ONLY | SUMMER PEAK HOURS ONLY |
|---|---|---|---|
| SOUTH-FACING (180° / 30°) | 0.00 | 0.00 | 0.00 |
| OPTIMAL ENERGY (188° / 28°) | 0.17 | 1.13 | 5.00 |
| OPTIMAL VALUE PLACEMENT (219° / 29°) | -1.86 | 0.88 | 16.44 |
| WEST-FACING PLACEMENT (270° / 30°) | -14.32 | -1.34 | 23.04 |
| OPTIMAL PEAK PLACEMENT (270° / 40°) | -19.55 | -7.20 | 24.07 |

FIG. 15

OPTIMALLY PLACING PHOTOVOLTAIC ARRAYS TO MAXIMIZE VALUE OF ENERGY PRODUCTION BASED ON PEAK POWER PRODUCTION, LOCAL SOLAR RADIATION, WEATHER, ELECTRICITY MARKET PRICES AND RATE STRUCTURES

CROSS REFERENCE TO RELATED APPLICATIONS

This application is related to the following commonly owned co-pending U.S. Patent Application:

Provisional Application Ser. No. 62/014,842, "Optimally Placing Photovoltaic Arrays to Maximize Value of Energy Production Based on Peak Power Production, Local Solar Radiation, Weather, Electricity Market Prices and Rate Structures," filed Jun. 20, 2014, and claims the benefit of its earlier filing date under 35 U.S.C. § 119(e).

GOVERNMENT INTERESTS

This invention was made with government support under Grant No. DE-OE0000219 awarded by United States Department of Energy. The U.S. government has certain rights in the invention.

TECHNICAL FIELD

The present invention relates generally to the photovoltaic systems, and more particularly to optimally placing photovoltaic arrays to maximize the value of energy production based on peak power production, local solar radiation, weather, electricity market prices and rate structures.

BACKGROUND

A photovoltaic system (informally, PV system) is an arrangement of components designed to supply usable electric power for a variety of purposes, using the sun (or, less commonly, other light sources) as the power source. PV systems may be built in various configurations: off-grid without battery (array-direct); off-grid with battery storage for DC-only appliances; off-grid with battery storage for AC and DC appliances; grid-tie without battery; and grid-tie with battery storage.

A photovoltaic array (also called a solar array) consists of multiple photovoltaic modules, casually referred to as solar panels, to convert solar radiation (sunlight) into usable direct current (DC) electricity. A photovoltaic system for residential, commercial, or industrial energy supply normally contains an array of photovoltaic (PV) modules, one or more DC to alternating current (AC) power converters (also known as inverters), a racking system that supports the solar modules, electrical wiring and interconnections, and mounting for other components. Optionally, a photovoltaic system may include any or all of the following: a revenue-grade meter, a maximum power point tracker (MPPT), a battery system and charger, a global positioning system (GPS) solar tracker, energy management software, solar concentrators, solar irradiance sensors, an anemometer, or task-specific accessories designed to meet specialized requirements for a system owner. The number of modules in the system and the modules' rated capacity determines the total DC watts capable of being generated by the solar array; however, the inverter ultimately governs the amount of AC watts that can be distributed for consumption.

Conventionally, solar PV panels are often installed on roofs and are typically set tilted and arranged in spaced-apart rows. For flat roofs, there is more flexibility for how to place the arrays. There have been many investigations into the optimal tilt for solar PV system to maximize the energy production (i.e., maximize the conversion of solar radiation (sunlight) into usable direct current (DC) electricity). Many of these analyses consider solar energy production assuming that a southern azimuth (in the northern hemisphere) is optimal for energy production. While the south-orientated rule-of-thumb might be best for completely clear skies, non-uniform, temporal meteorological conditions, such as fog or clouds, environmental conditions, such as smog, and geographic features, such as mountains, can block solar radiation and reduce solar panel output at different times of the day and change the optimal orientation of the panels. Additionally, solar PV power output is a function of panel temperature and/or panel materials, so dry bulb temperature fluctuations and wind speed (because of convective heating or cooling) can also alter PV electricity production profiles.

Another consideration for optimal PV orientation is the value of the electricity generated. Because solar energy production does not always precisely align with maximum electricity grid load or price, even placements that might be non-optimal from an energy production basis might be optimal on an economic or peak power production basis. For example, one analysis used day-ahead market electricity prices to determine optimal solar PV orientations in California. The conclusion of such an analysis was that the market electricity prices shifted the optimal orientation of some arrays west of south.

While there have been some analysis in determining the optimal tilt and azimuth angles as well as determining the optimal PV orientation based on the value of the electricity generated, there has been no analysis considering the production of AC electricity (after panel, inverter and other derate losses) as the metric for optimal placement. Furthermore, such analyses were limited to a local geographic area without considering multiple economic inputs. Additionally, such analyses did not consider the value of energy production from the perspective of various users (e.g., residential customers, utility companies, businesses), where the "value" may correspond to an economic value or a non-economic value (e.g., reduction in carbon dioxide).

BRIEF SUMMARY

In one embodiment of the present invention, a method for optimally placing photovoltaic arrays to maximize a value of energy production comprises calculating incident solar radiation for a plurality of placements of the photovoltaic arrays accommodating different azimuths and tilts. The method further comprises estimating alternating current solar photovoltaic electricity energy and power production from the calculated solar radiation on a plane, weather data and geographic data. The method additionally comprises calculating a value of solar photovoltaic electricity energy and power produced by the photovoltaic arrays for the plurality of placements accommodating different azimuths and tilts using the estimated alternating current solar photovoltaic electricity and power production. Furthermore, the method comprises selecting a placement out of the plurality of placements for the photovoltaic arrays corresponding to a highest value of the solar photovoltaic electricity energy and power produced by the photovoltaic arrays.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 3 is a table (Table 1) that summarizes the results of the various cases for both total energy production and the value of the energy produced in Austin, Tex. in accordance with an embodiment of the present invention;

FIGS. 14A-14B are plots that show the average generation curves for various solar placements in Austin using TMY data and average ERCOT wholesale electricity market prices, including optimal peak placement in accordance with an embodiment of the present invention; and FIG. 15 is a table (Table 2) that summarizes the differences in energy produced (area under the curves, relative to the rule of thumb placement) from the placements shown in FIGS. 14A-14B in accordance with an embodiment of the present invention.

DETAILED DESCRIPTION

Figure 1:
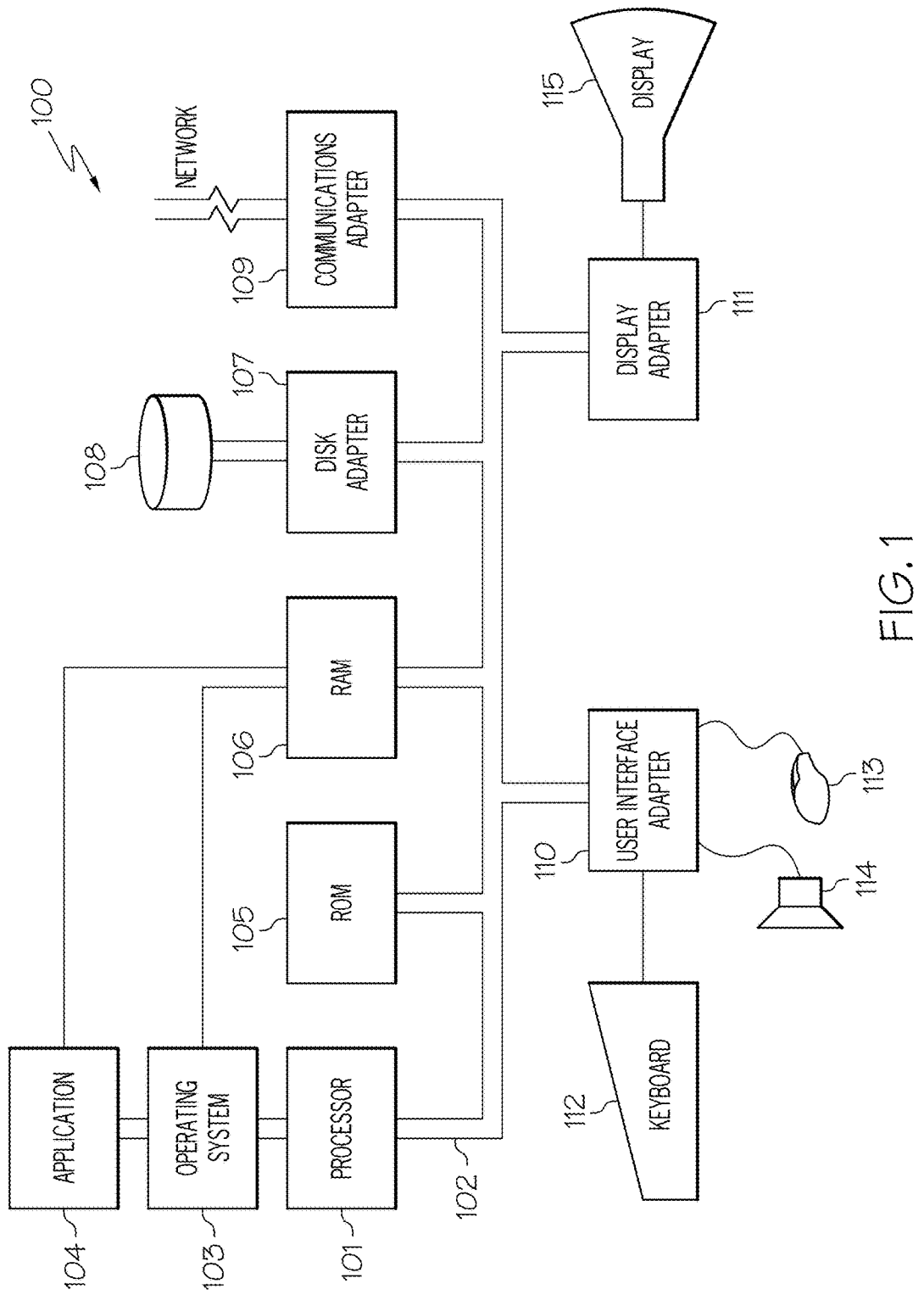
FIG. 1 illustrates a hardware configuration of a computer system which is representative of a hardware environment for practicing the present invention.

Referring now to the Figures in detail, FIG. 1 illustrates a hardware configuration of a computer system 100 which is representative of a hardware environment for practicing the present invention. Computer system 100 has a processor 101 coupled to various other components by system bus 102. An operating system 103 runs on processor 101 and provides control and coordinates the functions of the various components of FIG. 1. An application 104 in accordance with the principles of the present invention runs in conjunction with operating system 103 and provides calls to operating system 103 where the calls implement the various functions or services to be performed by application 104. Application 104 may include, for example, a program for optimally placing photovoltaic arrays to maximize the value of energy production based on peak power production, local solar radiation, weather, electricity market prices and rate structures as discussed further below in association with FIGS. 2-15.

Referring again to FIG. 1, read-only memory ("ROM") 105 is coupled to system bus 102 and includes a basic input/output system ("BIOS") that controls certain basic functions of computer system 100. Random access memory ("RAM") 106 and disk adapter 107 are also coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive. It is noted that the program for optimally placing photovoltaic arrays to maximize the value of energy production based on peak power production, local solar radiation, weather, electricity market prices and rate structures, as discussed further below in association with FIGS. 2-15, may reside in disk unit 108 or in application 104.

Computer system 100 may further include a communications adapter 109 coupled to bus 102. Communications adapter 109 interconnects bus 102 with an outside network thereby enabling computer system 100 to communicate with other such systems.

I/O devices may also be connected to computer system 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to computer system 100 through keyboard 112 or mouse 113 and receiving output from computer system 100 via display 115 or speaker 114.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, conventionally, solar PV panels are often installed on flat roofs and are typically set tilted and arranged in spaced-apart rows. There have been many investigations into the optimal tilt for solar PV system to maximize the energy production (i.e., maximize the conversion of solar radiation (sunlight) into usable direct current (DC) electricity). Many of these analyses consider solar energy production assuming that a southern azimuth (in the northern hemisphere) is optimal for energy production. While the south-orientated rule-of-thumb might be best for completely clear skies, non-uniform, temporal meteorological conditions, such as fog or clouds, environmental conditions, such as smog, and geographic features, such as mountains, can block solar radiation and reduce solar panel output at different times of the day and change the optimal orientation of the panels. Additionally, solar PV power output is a function of panel temperature and/or panel materials, so dry bulb temperature fluctuations and wind speed (because of convective heating or cooling) alter PV electricity production. Another consideration for optimal PV orientation is the value of the electricity generated. Because solar energy production does not always precisely align with maximum electricity grid load, even placements that might be non-optimal from an energy production basis might be optimal on an economic or peak power production basis. For example, one analysis used day-ahead market electricity prices to determine optimal solar PV orientations in California. The conclusion of such an analysis was that the market electricity prices shifted the optimal orientation of some arrays further west of south. While there have been some analysis in determining the optimal tilt and azimuth angles as well as determining the optimal PV orientation based on the value of the electricity generated, there has been no analysis considering the production of AC electricity (after panel, inverter and other derate losses) as the metric for optimal placement. Furthermore, such analyses were limited to a local geographic area without considering multiple economic inputs. Additionally, such analyses did not consider the value of energy production from the perspective of various users (e.g., residential customers, utility companies, businesses), where the "value" may correspond to an economic value or a non-economic value (e.g., reduction in carbon dioxide).

The principles of the present invention provide a means for optimally placing photovoltaic arrays to maximize the value of energy production based on multiple inputs, including peak power production, local solar radiation, weather, electricity market prices and rate structures as discussed below in connection with FIGS. 2-15. The value of maximizing energy production, as used herein, can correspond to maximizing or optimizing energy, power, economic value or non-economic value (e.g., carbon dioxide displacement). Furthermore, the value of maximizing energy production is dependent upon the user in question (e.g., resident in a residential area, a utility company, a business). That is, the value of maximizing energy production is dependent upon the user who is to benefit from the analysis discussed herein.

Figure 2:
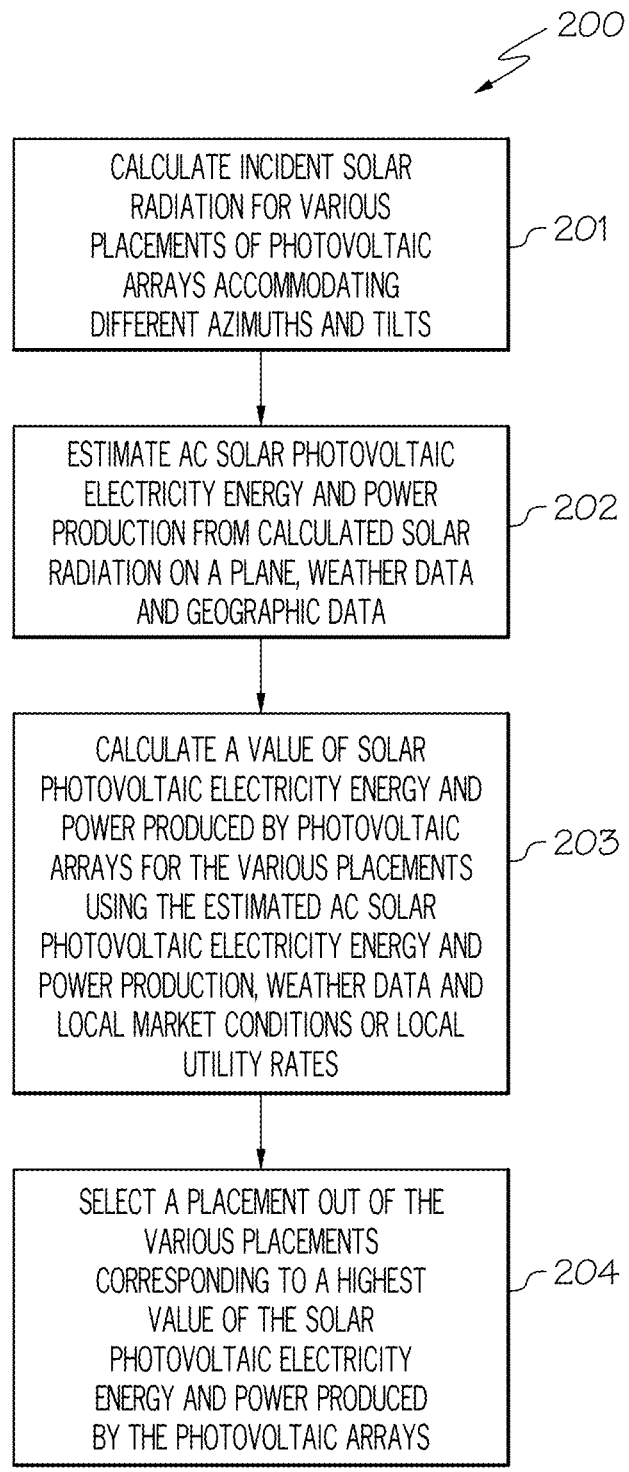
FIG. 2 is a flowchart of a method for maximizing the value of energy production based on multiple inputs, offsetting building peak power consumption, local solar radiation, weather, geography, electricity market prices and rate structures in accordance with an embodiment of the present invention.

Referring now to FIG. 2, FIG. 2 is a flowchart of a method 200 for maximizing the value of energy production based on multiple inputs, including peak power production, local solar radiation, weather, electricity market prices and rate structures in accordance with an embodiment of the present invention.

The analysis of method 200 uses available solar insolation and electricity price data to: (1) determine the insolation on a given plane (with available solar radiation tools); (2) build a system-based solar PV production model; (3) estimate the total energy, power, and economic impacts of system azimuth and tilt (placement) for Austin, Tex.; (4) extend the analysis to other locations across the United States; and (5) explore the peak power production implications of varying solar placements using the aforementioned datasets. The principles of the present invention could also be used to deploy multiple arrays at different placements in order to mitigate the effects of all local solar arrays coming on or going off line at the same time, commonly referred to as "ramp rate."

Referring to FIG. 2, in step 201, the incident solar radiation for various placements of photovoltaic arrays accommodating different azimuths and tilts is calculated. In one embodiment, the incident solar radiation for multiple azimuths and tilts were calculated so as to determine the value of various solar placements. In one embodiment, there are three main components in the calculated solar radiation on a surface: (1) direct beam; (2) diffuse from the sky; and (3) and the reflected from the ground. Many models use the same methods for calculating the direct beam and reflected, but differ on methods of calculating incident diffuse from the sky. In one embodiment of the present invention, method 200 utilizes the solar package of the R language (O. Perpinan, "Solar Radiation and Photovoltaic Systems with R," Journal of Statistical Software, Vol. 50, Issue 9, 2012, pp. 1-32, which is incorporated herein by reference in its entirety), which uses the diffuse model of Hay and McKay (Hay et al., "Estimating Solar Irradiance on Inclined Surfaces: A Review and Assessment of Methodologies," International Journal of Solar Energy, Vol. 3, Issue 4, 1985, pp. 203-210, which is incorporated herein by reference in its entirety), with the horizon brightness correction proposed by Reindl et al. (Reindl et al., "Evaluation of Hourly tilted Surface Radiation Models," Solar Energy, Vol. 45, Issue 1, 1990, pp. 9-17, which is incorporated herein by reference in its entirety). The total effective radiation on a tilted plane is given by Equation 1:

$$I_T = B_T + R_T + D_T \quad (1)$$

where $I_T$ is the incident radiation on the tilted plane, and $B_T$ is the beam radiation on the tilted plane given by Equation 2:

$$B_T = I_B R_B \quad (2)$$

where $I_B$ is the beam radiation on the horizontal plane, $R_B$ is the ratio of beam radiation on the tilted plane to that on a horizontal surface given by Equations 3-5:

$$R_B = \frac{\cos(\theta)}{\cos(\theta_2)} \quad (3)$$

$$\cos(\theta) = \sin(\delta)\sin(\phi)\cos(\beta) - \quad (4)$$
$$\sin(\delta)\cos(\phi)\sin(\beta)\cos(\gamma) + \cos(\delta)\cos(\phi)\cos(\beta)\cos(\omega) +$$
$$\cos(\delta)\sin(\phi)\sin(\beta)\cos(\gamma)\cos(\omega) + \cos(\delta)\sin(\beta)\sin(\gamma)\sin(\omega)$$

$$\cos(\theta_2) = \cos(\phi)\cos(\delta)\cos(\omega) + \sin(\phi)\sin(\delta) \quad (5)$$

where $\delta$ is the declination, $\varphi$ is the local latitude, $\beta$ is the tilt of the surface, $\gamma$ is the surface azimuth angle, and $\omega$ is the hour angle. RT,I is the reflected radiation on the tilted plane given by Equation 6:

$$R_T = \alpha I_0 \frac{1 - \cos(\beta)}{2} \quad (6)$$

where $\alpha$ is the albedo of the ground (assumed to be 0.2) and $I_o$ is the total incident radiation on the horizontal plane.

The diffuse component $D_T$ from Hay and McKay with the horizon brightness correction proposed by Reindl et al. is given by Equation 7:

$$D_{T,i} = D_0 \left[ \frac{1}{2}(1-\kappa)(1+\cos(\beta)) \times \left(1 + \sqrt{\frac{B_0}{C_0}} \times \sin(\beta/2)^\beta \right) + \kappa R_{B,i} \right] \quad (7)$$

where $D_0$ is the diffuse radiation on the horizontal plane, $\kappa$ is the anisotropy index such that $\kappa = I_B/I_o$ where $I_o$ is the solar constant, $B_0$ is the beam irradiance on the horizontal surface, and $G_0$ is the global irradiance on the horizontal surface.

It is noted that while the equations used herein (e.g., Equations (1)-(7)) are a commonly used model that the principles of the present invention may use other models for estimating the solar radiation on a tilted plane.

In step 202, the alternating-current (AC) solar photovoltaic electricity energy (kilowatts/hour) and power (kilowatts) production is estimated from the calculated solar radiation on a plane (calculated in step 201), weather data and geographic data (e.g., shadows from mountains). To estimate AC solar PV electricity production from solar radiation on a plane, a solar PV energy production model was built. The overall model is given in Equations 8-9:

$$P_{out,i} = \eta_{pv,i} \times \eta_{inv,i} \times \eta_{other} \times I_{T,i} \quad (8)$$

$$\eta_{pv,i} = \eta_{ref}\left[1 - \beta_{ref}\left[T_{a,i} - T_{ref} + (T_{NOCT} - T_{a,NOCT})\frac{I_{T,i}}{I_{NOCT}}\right]\right] \quad (9)$$

where $P_{out,i}$ is the power output of the system in W/m² of PV array, $\eta_{pv,i}$ is the efficiency of the solar PV panels, $\eta_{inv,i}$ is the efficiency of the (DC-AC) solar inverter, $\eta_{other}$ are other (in this case constant) derate factors (mismatch, connections, wiring, etc., taken to be 0.93) associated with solar PV arrays, $I_{T,i}$ is the incident radiation on the tilted plane (Equation 1), $\eta_{ref}$ is the efficiency of the PV panels (taken to be 12%), $\beta_{ref}$ is the temperature coefficient of the PV panels (taken to be 0.0045 K$^{-1}$), $T_a$ is the ambient temperature, $T_{ref}$ is the reference temperature of the PV panels (25° C.), $T_{NOCT}$ is the nominal operating cell temperature at operating test conditions, $T_{a,NOCT}$ is the ambient Nominal Operating Cell Temperature (NOCT) (20° C.) and $I_{NOCT}$ is the incident radiation for the NOCT test, which is 800 W/m², for an overview of the NOCT equations, see Skoplaki and Palyvos (Skoplaki et al., "On the Temperature Dependence of Photovoltaic Module Electrical Performance: A Review of Efficiency/Power Correlations," Solar Energy, Vol. 83, Issue 5, 2009, pp. 614-624, which is incorporated herein by reference in its entirety), all (besides constants) at time i. The efficiency of the modeled inverter $\eta_{inv,i}$ was modeled as a 6th degree polynomial fit of a commercially available solar inverter (Power-One PVI-5000), scaled from a nominal 5 kW PV array of commercially available solar PV panels (Lumos LS250) to a per m² of array.

In step 203, the value of solar photovoltaic electricity energy and power produced by the photovoltaic arrays is calculated for the various placements using the estimated AC solar photovoltaic electricity energy and production, weather data and local market conditions or local utility rates. The value of energy production, as used herein, can correspond to maximizing or optimizing energy, power, economic value or non-economic value (e.g., carbon dioxide displacement). Furthermore, the value of maximizing energy production is dependent upon the user in question (e.g., resident in a residential area, a utility company, a business). That is, the value of maximizing energy production is dependent upon the user who is to benefit from the analysis discussed herein and might differ for different users.

After construction of the solar PV model based on meteorological, astronomical conditions, and assumed PV characteristics, a second model was developed to calculate the solar PV electricity produced from a solar PV system for any given placement, accommodating different tilts and azimuths. This model consisted of three steps. First, given a placement and the horizontal solar radiation values, it calculated the solar radiation on a plane. Second, using the solar PV model discussed above and weather data, it calculated the energy produced at that placement. The last step calculated the value of the energy produced using either local market conditions or local utility rates.

In one embodiment, all possible combinations of azimuths ranging from 90° (due east) to 270° (due west) and tilts from 0° (horizontal) to 45° were used to calculate the solar insolation on the respective plane. These data were fed into the Solar PV Energy Production Model (discussed above), along with weather data to quantify the amount of energy produced over one year for that particular configuration. These data were then multiplied by the temporally corresponding ERCOT electricity market price (for the Austin specific analysis) or Time-of-Use (TOU) rate data (for the national analysis) and summed to calculate the value of the solar energy produced as per Equation 10:

$$\text{Value} = \sum_{i}^{1 \text{ year}} P_{out,i} \times \Delta t \times \text{Price}_{1,i} + P_{out,i} \times \text{Price}_{2,i} \quad (10)$$

where $P_{out,i}$ is the power output of the solar PV system in W, $\Delta t$ is the time-step, $\text{Price}_{1,i}$ is the economic price (ERCOT SPP or TOU rate, $/kWh), and $\text{Price}_{2,i}$ is the price associated with reduction in overall demand charges for a commercial or industrial consumer that has the solar PV system behind the meter, all at time i. For industrial solar power plants, $\text{Price}_{2,i}$ could also be used to estimate ancillary service value or a capacity payment. For this analysis $\text{Price}_{2,i}$ was considered to be fixed at 0 (because Texas has an energy-only market), but it could be considered in another analysis that looked at markets with capacity payments or the ability of solar PV to reduce demand changes for arrays behind the meter (many commercial and industrial customers have demand changes in addition to energy charges). In one embodiment, this price could be considered on a case by case basis. This calculation was then completed for multiple radiation inputs (measured, Typical Meteorological Year (TMY), and clear-sky), weather inputs (measured and TMY), and pricing inputs (market and electric rate) for Austin.

The analysis discussed above was then generalized to a national level. TMY data was gathered and processed in the same way as described above for 1,020 locations across the United States of America. The data were run through the solar placement value program in a similar fashion as discussed above. However, to speed up the process, an optimization routine (R function optim, with method of Byrd et. al. (Byrd et al., "A Limited Memory Algorithm for Bound Constrained Optimization," SIAM Journal of Scientific Computing, Vol. 16, Issue 5, 1995, pp. 1190-1208, which is incorporated herein by reference in its entirety)) was used so that each location's placements of both energy and value did not have to be directly computed. The optimization used a quasi-Newton method (L-BFGS-B), a version of the Broyden-Fletcher-Goldfarb-Shanno algorithm with box constraints (Nocedal et al., *Numerical Optimization*, $2^{nd}$ Edition, New York: Springer, 2006, which is incorporated herein by reference in its entirety). The initial starting point was taken to be the local location's rule of thumb placement.

The expanded model considered total energy produced, power produced, and the value of the produced energy. The energy-only model is the same as for the more Austin-specific analysis. However, the value of the energy model was somewhat different. In order to consider the regional differences in electricity markets, local TOU energy rates were used as a proxy for the temporal value of energy, as it was assumed that these rates would be designed such that times of higher costs would be typically associated with times of higher grid stress/demand. An attempt was made to obtain an electric utility TOU rate for each state from the OpenEI database. Of the 50 U.S. states, at least 37 states had TOU rates for at least one customer class. When each simulation was run, the amount of energy produced during a given interval was multiplied by the rate for that hour. For all locations within a given state, a single representative rate from a large city in that state was used, for states without TOU rates, the closest (shortest Euclidian distance) to the nearest rate (by latitude/longitude of the largest city in each state) was used. However, when making recommendations for a specific location, using exact local data would yield the best results.

In step 204, the placement out of the various placements with the highest value of the solar photovoltaic electricity energy and power produced by the photovoltaic arrays is selected. The placement corresponding to the highest value of solar energy produced corresponds to the placement that optimally maximizes energy production based on placement, peak power production, local solar radiation, weather, electricity market prices and rate structures. In this manner, by using a more complete set of factors in analyzing the best placement for the photovoltaic arrays from the perspective of the user in question (e.g., residential customer, utility company, business), the appropriate placement for the photovoltaic arrays is determined that maximizes the value of energy production (where "value" may correspond to an economic value or a non-economic value).

The last step of the analysis was to explore the effects of solar placement on summer peak power reduction. The summer peak times are defined as June-August, from 14:00-20:00 CST for Austin, Tex. These times are typically associated with high wholesale electricity prices and grid stress, mainly due to residential air-conditioning load. For this analysis, the same approach was taken as with Equation 10, except the $Price_{1,i}$ was given a value of 1 during summer peak hours and 0 otherwise.

The following discusses the results of the model and presents a discussion of the results and implications of this analysis for solar energy production.

To verify that the entire process was running correctly, the model was first executed with clear-sky radiation. Because there is no clear-sky equivalent weather information available, TMY weather data (temperature, wind speed) were used. Using clear-sky as the radiation input should cancel out all weather shading effects to solar panel production and should indicate an optimal energy azimuth of due south and a tilt related to the local latitude (about 30° for Austin). The model provided just that result, shown in FIG. 4 (discussed further below).

FIG. 3 is a table (Table 1) that summarizes the results of the various cases for both total energy production and the value of the energy produced in Austin, Tex. in accordance with an embodiment of the present invention. For the cases where the placement was optimized for maximum total energy generated, the TMY case shifts the arrays about 8° west of south. For the cases where the placement was optimized for maximum total economic value of the energy generated, the cases shift the arrays about 20 to 51° west of south, depending on the price considered. While the increase in the amount of energy generated in the optimal cases was negligible, the increased economic values ($/m²/yr) for shifting the solar PV arrays west of south were on the order of 1-7%.

Figure 4:
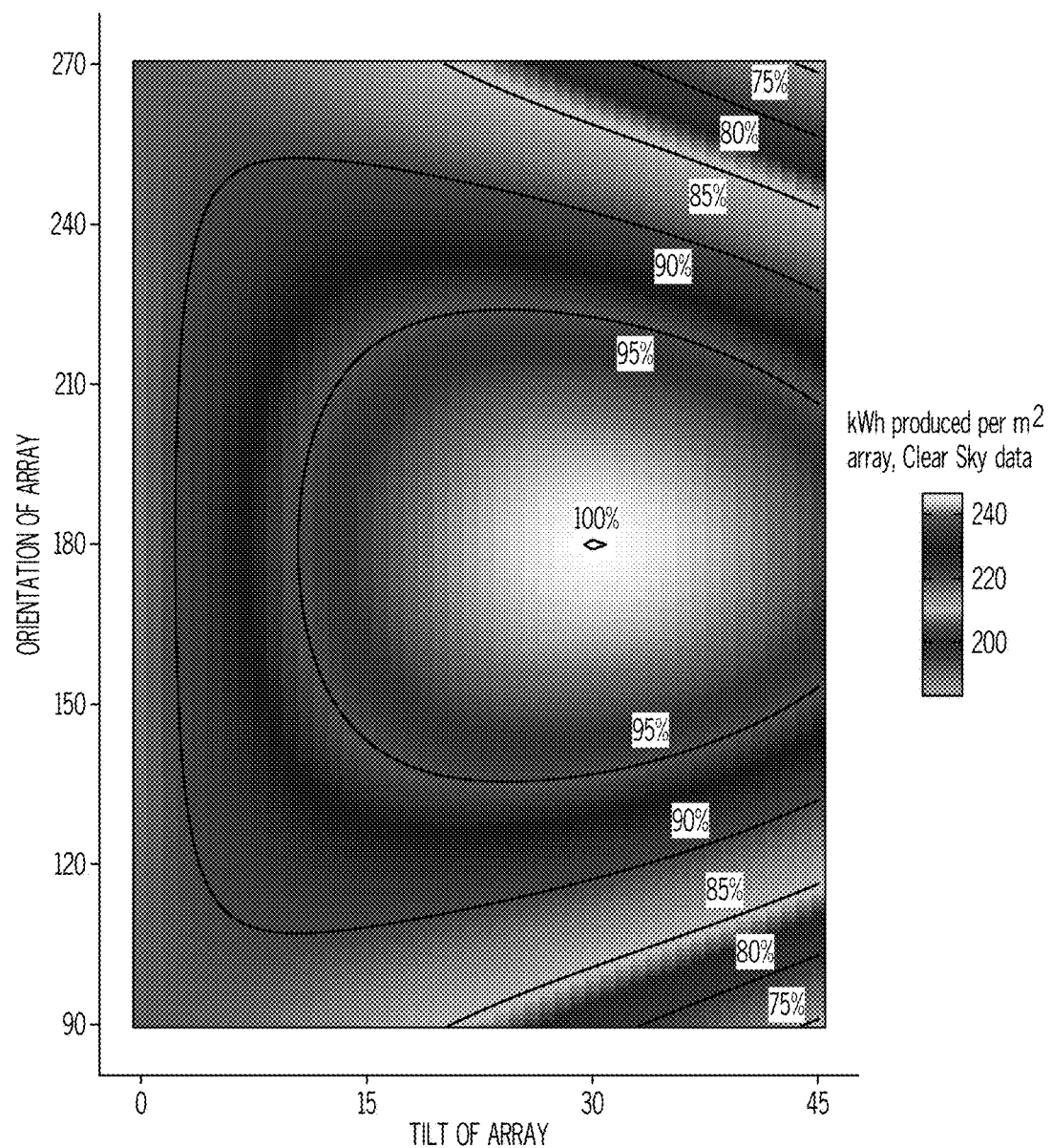
FIG. 4 shows the total number of kWh per year produced (normalized for 1 m$^2$ of array) for every combination of azimuth and tilt, 90°-270° and 0°-45°, respectfully using clear-sky radiation and typical meteorological year (TMY) weather data in accordance with an embodiment of the present invention.

FIG. 4 shows the total number of kWh per year produced (normalized for 1 m² of array) for every combination of azimuth and tilt, 90°-270° and 0°-45°, respectfully using clear-sky radiation and TMY weather data in accordance with an embodiment of the present invention. In particular, FIG. 4 is a heat map of model results for clear-sky radiation and TMY weather showing an optimal energy azimuth of 180° and 30° tilt. Contour lines show areas of percent of maximum energy in 5% increments.

Figure 5:
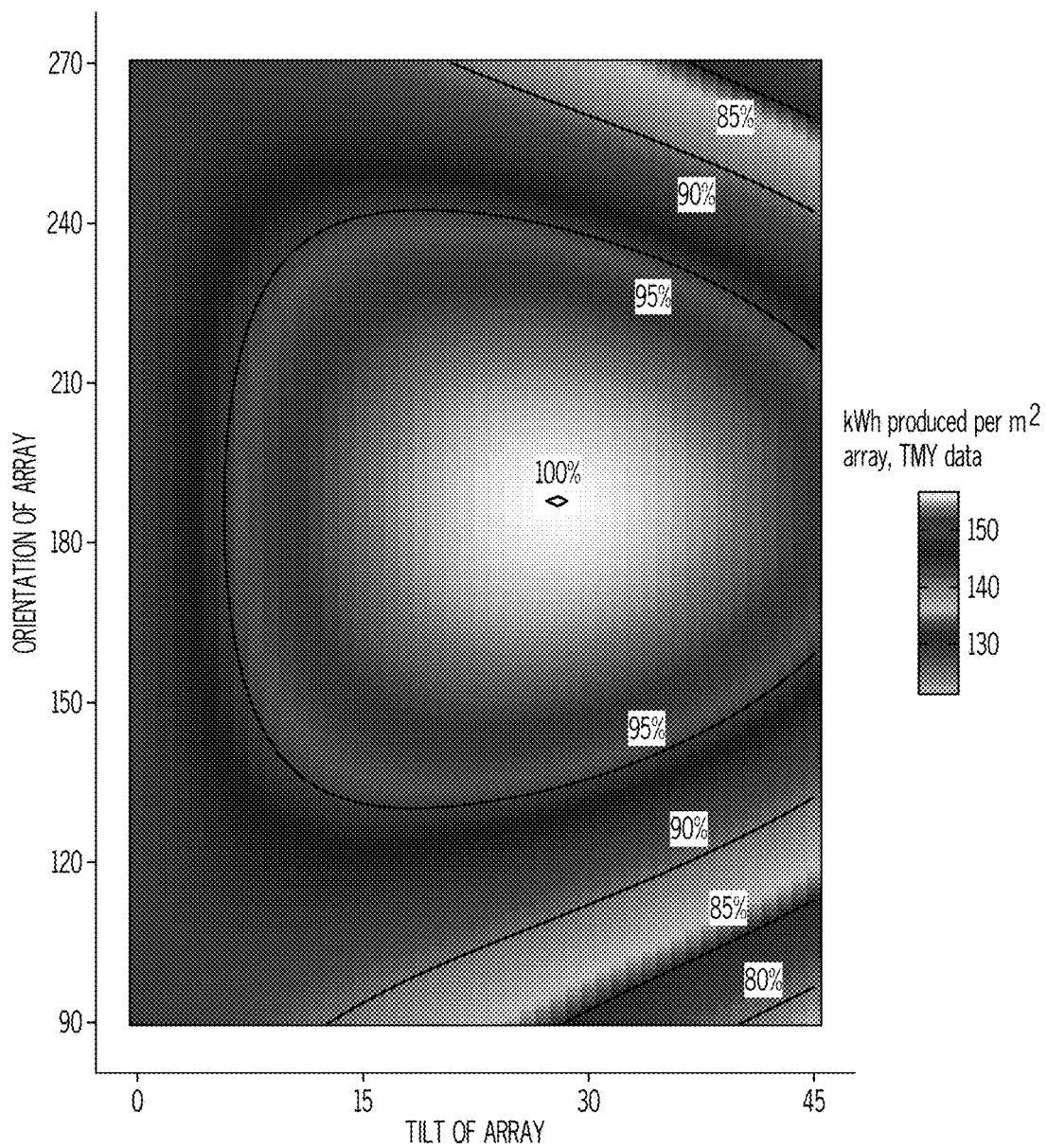
FIG. 5 shows the total number of kWh per year produced (normalized for 1 m$^2$ of array) for every combination of azimuth and tilt, 90°-270° and 0°-45°, respectively, using TMY radiation and weather on optimal placement in accordance with an embodiment of the present invention.

FIG. 5 shows the effect of using TMY radiation and weather on optimal placement in accordance with an embodiment of the present invention. In particular, FIG. 5 is a heat map of model results for TMY radiation and TMY weather showing an optimal energy azimuth of 188° and 28° tilt, indicating the due south azimuth might not be optimal for total energy generation in Austin, Tex. when typical meteorological conditions are considered. Contour lines show areas of percent of maximum energy in 5% increments. The number of kWhs overall are reduced compared to FIG. 4 because this data included the effects of clouds on the amount of solar radiation that reaches the earth's surface. It is interesting to note that using "typical meteorological" data for Austin indicates that shifting the array west 8° and 2° towards the horizontal (from the 180°/30° rule-of-thumb) produces the most amount of energy, about 0.2% more than the rule-of-thumb. These results would suggest that meteorological events, such as cloud cover in the mornings during the winter, typically block the sun more than in the afternoon during the summer.

Figure 6:
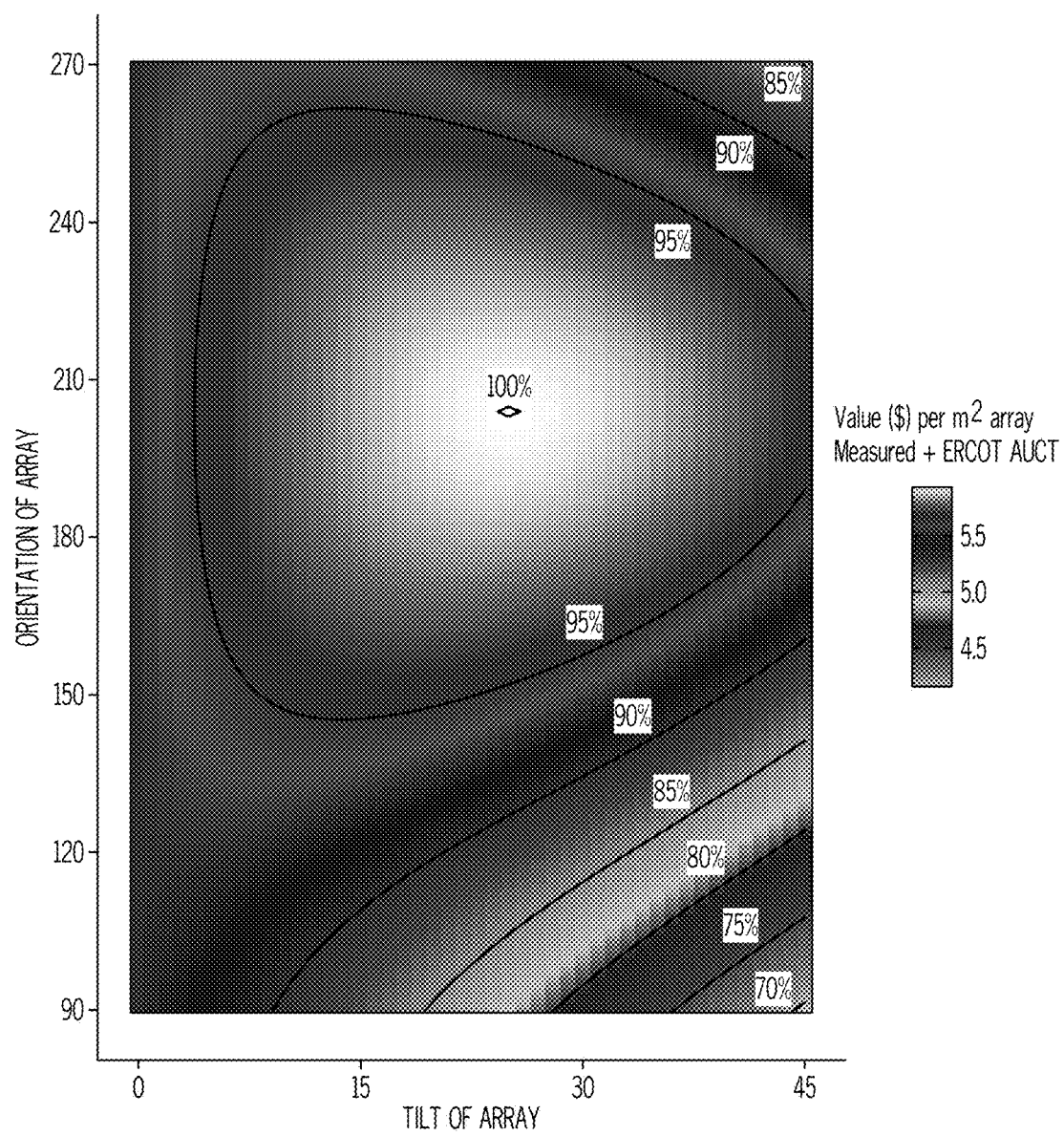
FIG. 6 is a heat map of model results for measured 2012-2013 radiation and weather with coincident Electric Reliability Council of Texas (ERCOT) wholesale electricity prices showing an optimal value ($/m$^2$/year) azimuth of 204° and 25° tilt for Austin, Tex. in accordance with an embodiment of the present invention.
Figure 7:
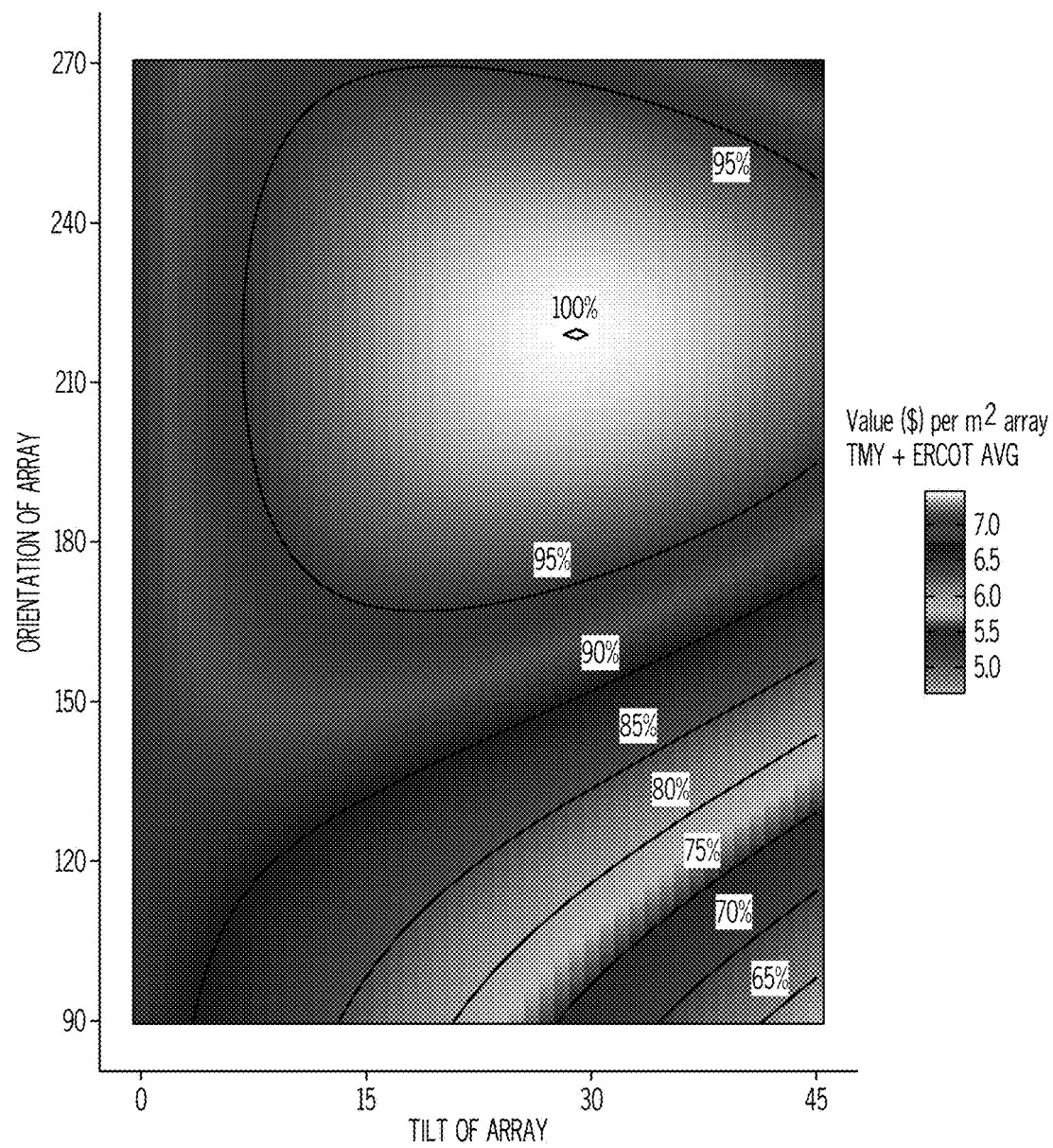
FIG. 7 is a heat map of model results for TMY radiation and weather with average ERCOT wholesale electricity prices showing an optimal value ($/m$^2$/year) azimuth of 219° and 29° tilt for Austin, Tex. in accordance with an embodiment of the present invention.

FIGS. 6 and 7 show the optimal azimuth for the value ($/m²/year) of electricity produced (Equation 10) for the 2012-2013 measured data and coincident ERCOT prices and the TMY data with average ERCOT prices, respectfully, in accordance with an embodiment of the present invention. FIG. 6 is a heat map of model results for measured 2012-2013 radiation and weather with coincident ERCOT prices showing an optimal value ($/m²/year) azimuth of 204° and 25° tilt for Austin, Tex. Contour lines show areas of percent of maximum values in 5% increments.

FIG. 7 is a heat map of model results for TMY radiation and weather with average ERCOT prices showing an optimal value ($/m²/year) azimuth of 219° and 29° tilt for Austin, Tex. Contour lines show areas of percent of maximum values in 5% increments.

As illustrated in FIGS. 6 and 7, the placement is shifted west when optimizing based on market value.

Figure 8:
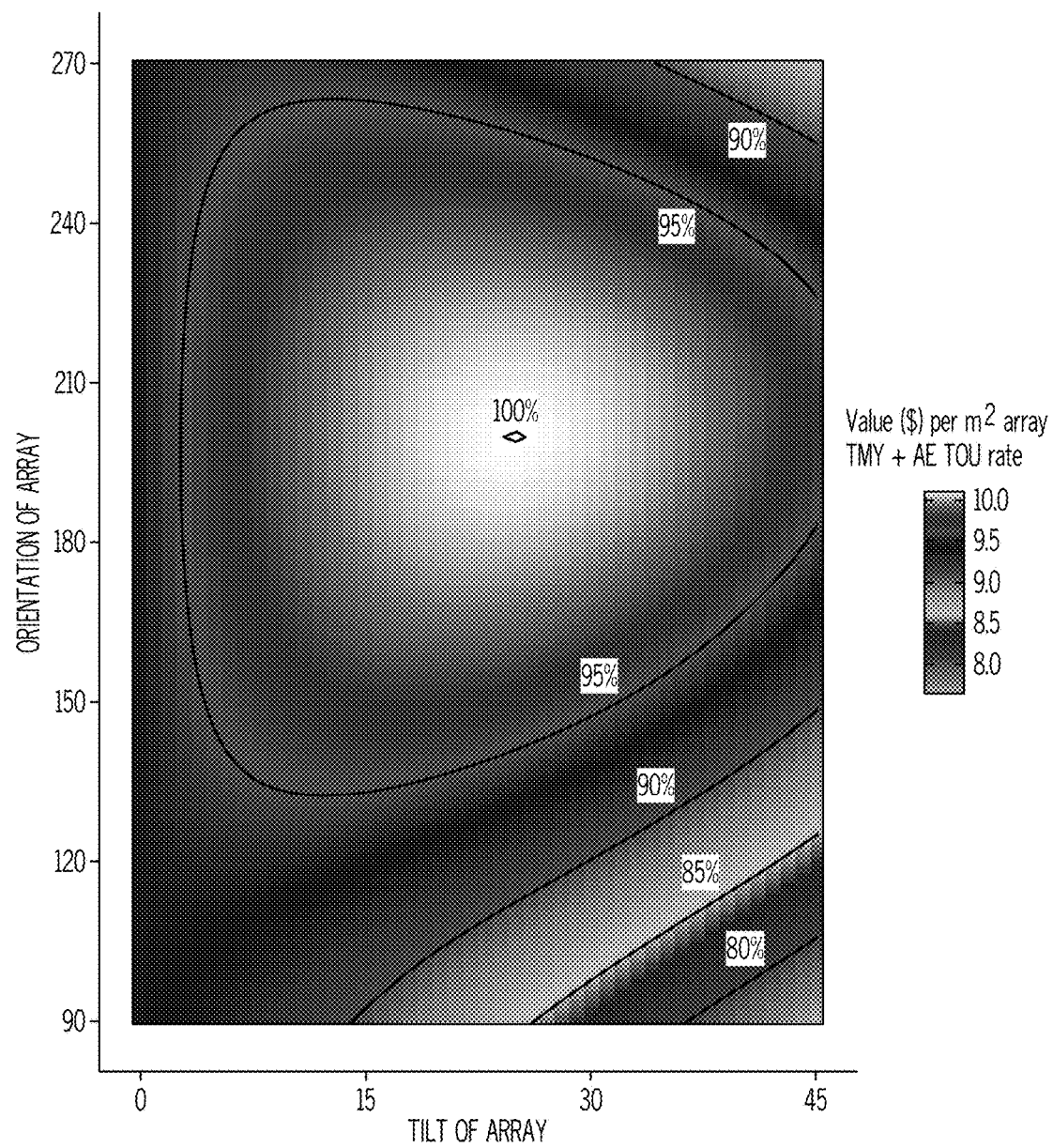
FIG. 8 shows the values associated with Austin TMY solar radiation and weather with Austin Energy's residential Time-of-Use (TOU) rate and also shows how azimuth and tilt are related under the TOU rate in accordance with an embodiment of the present invention.

FIG. 8 shows the values associated with Austin TMY solar radiation and weather with the Austin Energy's residential TOU rate and also shows how azimuth and tilt are related under the TOU rate in accordance with an embodiment of the present invention. In particular, FIG. 8 is a heat map of model results for TMY radiation and weather with the Austin Energy's Residential TOU rate showing an optimal value ($/m²/year) azimuth of 200° and 25° tilt for Austin, Tex. Contour lines show areas of percent of maximum values in 5% increments. For example, if a solar PV array's azimuth were constrained to 150°, its optimal tilt is not the 25° associated with the unconstrained array, but 18°, a 0.5% ($/m2/year) difference.

Figure 9:
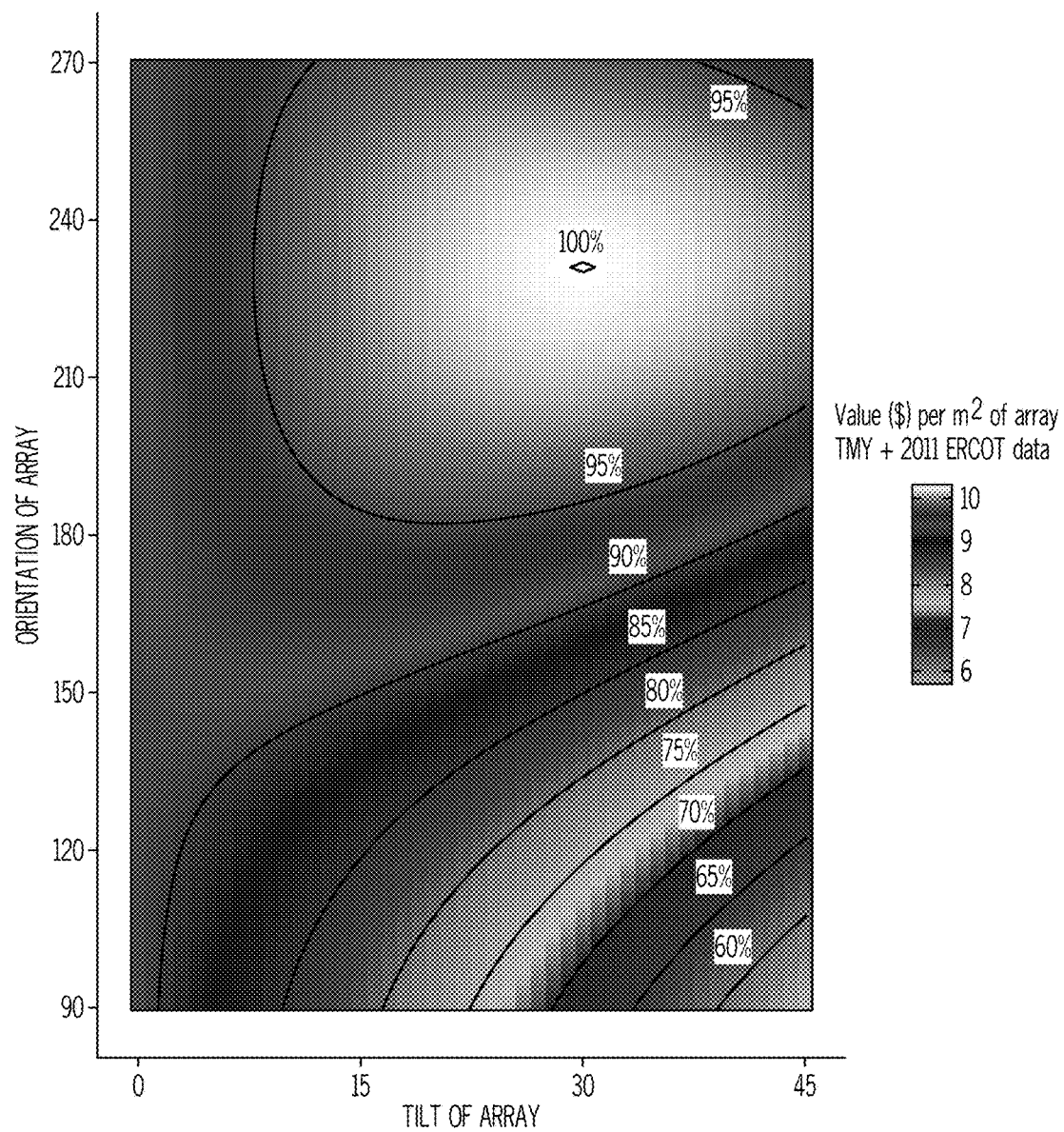
FIG. 9 shows the values associated with Austin TMY solar radiation and weather with ERCOT prices from 2011 in accordance with an embodiment of the present invention.

FIG. 9 shows the values associated with Austin TMY solar radiation and weather with ERCOT prices from 2011 in accordance with an embodiment of the present invention. In particular, FIG. 9 is a heat map of model results for TMY radiation and 2011 ERCOT prices showing an optimal value ($/m²/year) azimuth of 231° and 30° tilt for Austin, Tex. Contour lines show areas of percent of maximum values in 5% increments.

In general, higher summer electricity prices drive the azimuth west and tilt towards the horizontal, as is seen in the Austin+TOU rate case. However, the later and the higher the electricity prices, the further the sun has dipped in the sky and the steeper the tilt will need to be to capture the incident radiation as seen in the TMY+ERCOT AVG and TMY+ERCOT 2011 cases. The TMY+ERCOT 2011 case is taken to be a scarcity pricing scenario as that year the price cap ($3000/MWh) in ERCOT was hit for 54 15-minute periods, most after 16:00 local time, versus just once in 2012 and twice in 2013. However, the current price cap in ERCOT has been raised to $5000/MWh with plans to further increase to $9000/MWh. A high price cap and more instances of scarcity pricing (during historically consistent times of the day) could have an impact on the optimal placements of fixed solar PV installations, namely further west with a steeper tilt. Utilities could incentivize these solar placements as a hedge towards a more volatile wholesale electricity market.

Figure 10:
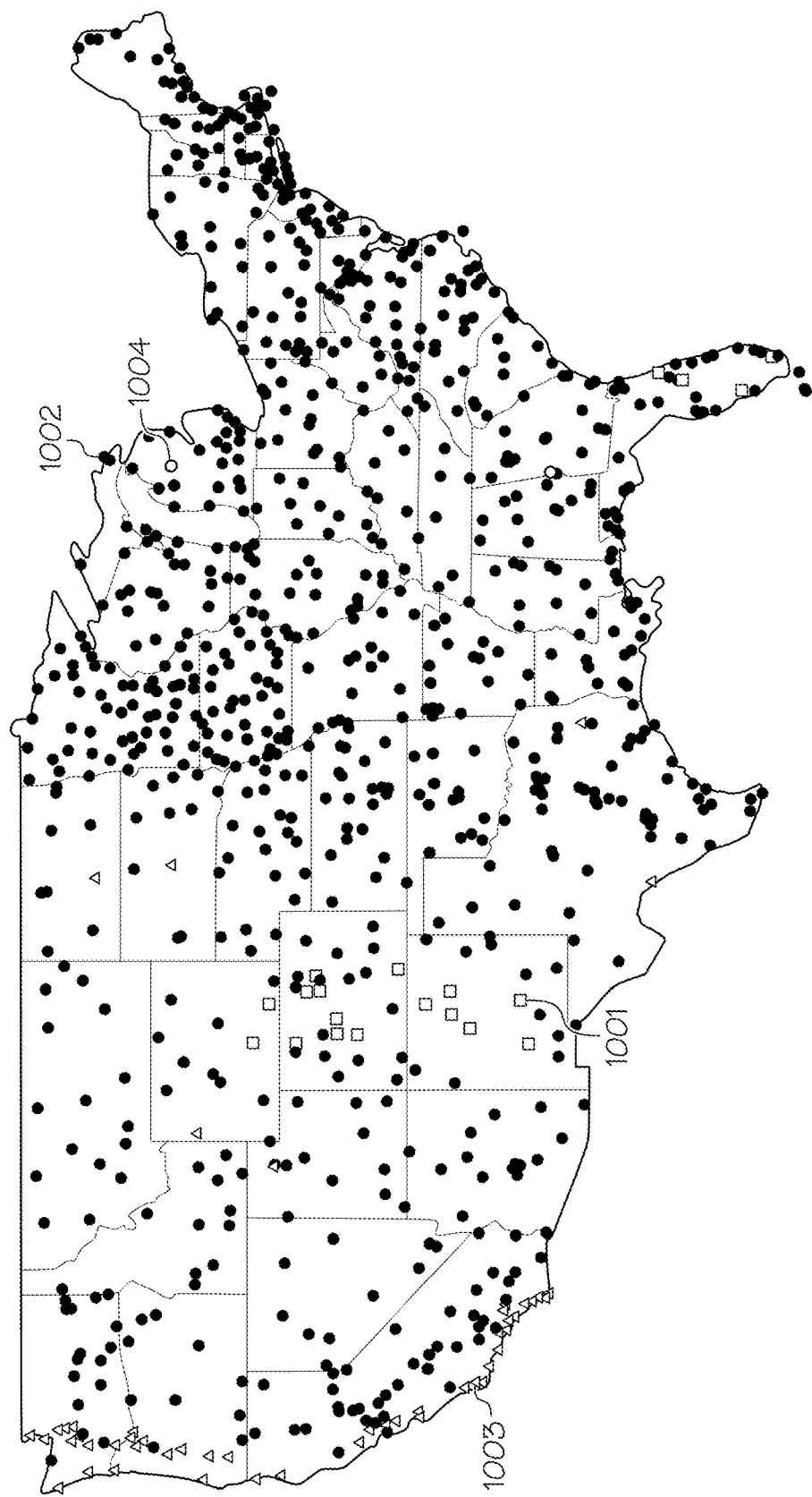
FIG. 10 is a map of continental U.S. showing the energetically optimal azimuth of solar PV systems in accordance with an embodiment of the present invention.

With respect to determining the optimal solar placement on a national level, the same analysis was performed on data from 1020 locations in the U.S. that have TMY data. FIG. 10 shows the results of the energy-only analysis. FIG. 10 is a map of continental U.S. showing the energetically optimal azimuth of solar PV systems in accordance with an embodiment of the present invention. Points 1001 indicate southerly optimal solar azimuths (160°-170°), points 1002 indicate southerly optimal solar azimuths (170°-190°), points 1003 indicate southerly optimal solar azimuths (190°-200°) and points 1004 indicate optimal azimuths west of south (greater than 200°).

Most of the locations in the US fall within the south-facing band (170°-190°) indicating that the rule-of-thumb approach might work for most of the country. However, there are some notable exceptions. The results indicate that a band of locations from Wyoming, through Colorado, and into New Mexico have optimal azimuths that face east of south. This result is probably explained in that these locations are along the Rocky Mountains and have prevailing summer afternoon thunderstorms. Another location of interest is the U.S. west coast, where the model indicates an optimal west-facing azimuth for almost the entire length of the coast. This effect is probably explained by persistent cloudiness in the early part of the day.

These findings are significant because Colorado ranks 10th (130 MW) in the U.S. for installed solar capacity and California ranks 1st at 2,051 MW (Texas ranks 7th at 174 MW). While data on the actual placements of solar PV systems are not readily available, if roughly half of California's small scale (<25 kW capacity) solar output could be improved 1% via an optimal placement, the result would be an additional production of approximately 15 million kWh/year at current capacity levels—about the total annual electricity consumption of 2,200 California homes.

Figure 11:
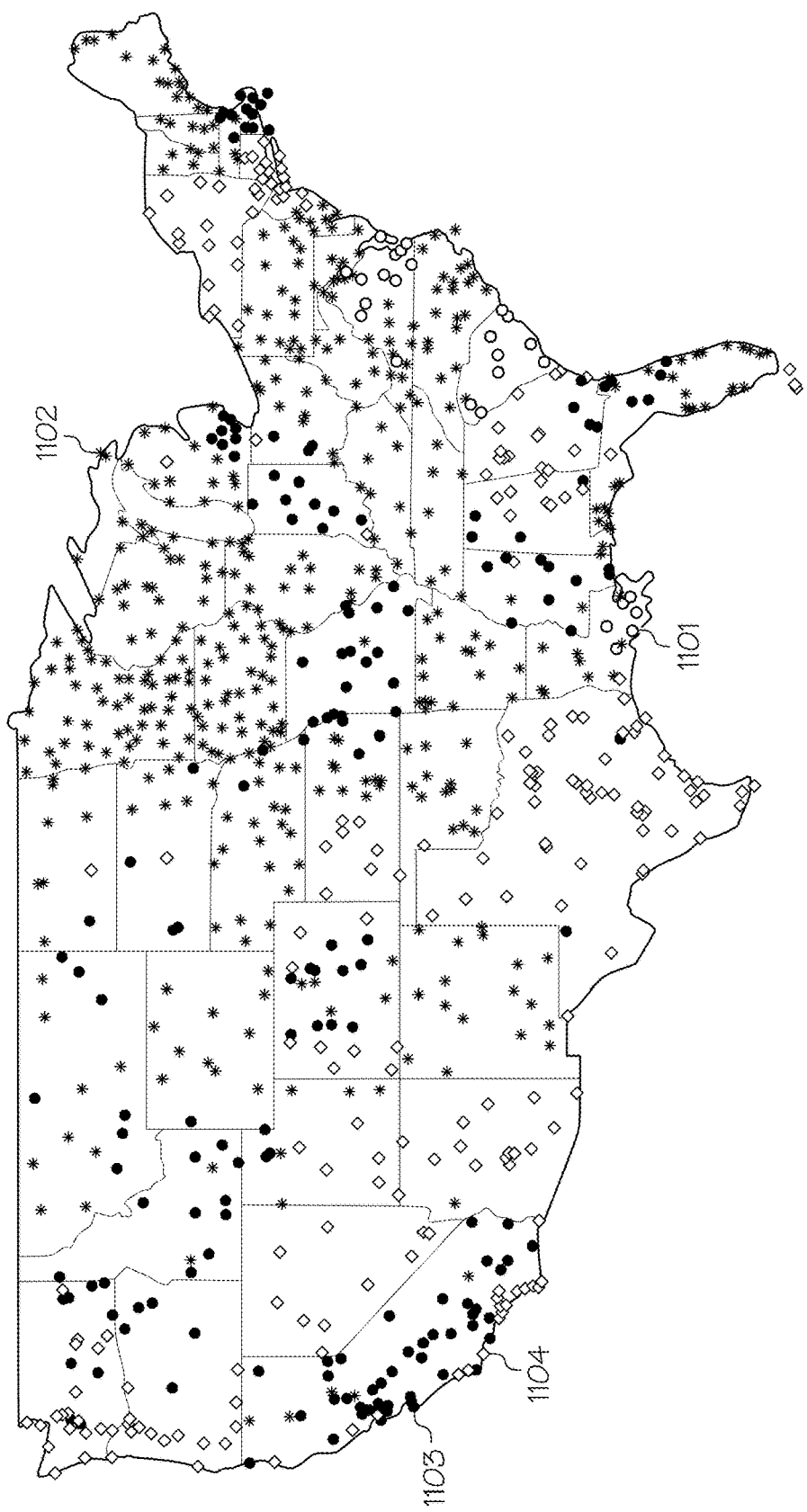
FIG. 11 is a map of continental U.S. showing the optimal azimuth of solar PV systems when considering the value of the solar energy produced using electric utility rates local to the solar arrays in accordance with an embodiment of the present invention.

FIG. 11 shows the results when considering the maximum economic value of the solar energy produced for all considered solar placements. FIG. 11 is a map of continental U.S. showing the optimal azimuth of solar PV systems when considering the value of the solar energy produced in accordance with an embodiment of the present invention. Points 1101 indicate southerly optimal solar azimuths (160°-170°), points 1102 indicate southerly optimal solar azimuths (170°-190°), points 1103 indicate southerly optimal solar azimuths (190°-200°) and points 1104 indicate optimal azimuths west of south (greater than 200°).

Again, the value of the electricity produced is approximated by the structure of a utility TOU pricing structure that is either in the state of the TMY data location, or if the state does not have a TOU rate available, the closest location with a TOU rate was chosen.

Overall the economic consideration shifts the number of optimally south-facing (170°-190°) array locations from 920 (pure energy analysis) to 477 locations. The number of slightly west-facing (190°-200°) array locations increased from 62 to 234, the number of further west-facing arrays (greater than 200°) increased from 2 to 264, the number of slightly east-facing (160°-170°) array locations increased from 36 to 45. However, because the rates were not the same, the change of optimal economic placement is different for different locations. A significant portion of the western half of the U.S., including Texas shifted west. Even some arrays that had an optimal energy placement east of south in Colorado trended west. The eastern half of the U.S., which for energy only was almost all south-facing is more mixed. For example, the TOU rates of Virginia and South Carolina, while they have higher summer afternoon prices, also have high morning prices in the winter months, presumably due to a morning grid peak from electrical heating or activity demand. Other states, such as New York, had rate structures that reflect higher afternoon grid demand.

Figure 12:
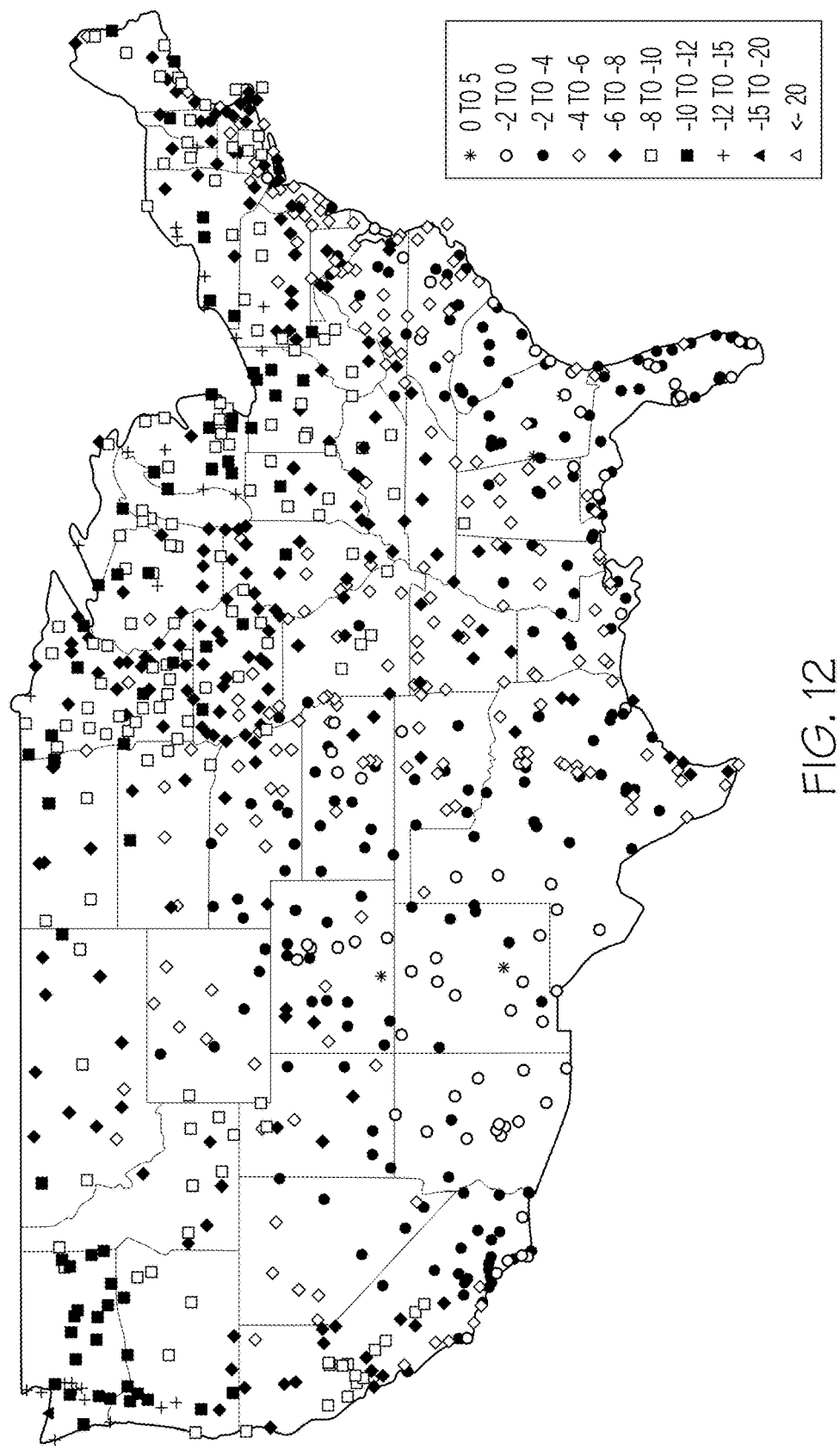
FIG. 12 is a map of continental U.S. showing deviation from the rule of thumb tilt (local latitude) based on total energy production in accordance with an embodiment of the present invention.

While best practices would have tilts of solar systems determined by local solar data as is attempted in this analysis, many times the tilt is decided based on the local latitude alone. FIG. 12 shows the deviation from the rule of thumb (i.e. local latitude) for optimal energetic tilt in each location. FIG. 12 is a map of continental U.S. showing deviation from the rule of thumb tilt (local latitude) based on total energy production in accordance with an embodiment of the present invention. Negative values means that the optimal tilt is below the local latitude.

FIG. 12 suggests that while accurate for parts of the southwest U.S., the optimal energy tilt is typically lower than the local latitude, especially in the states surrounding Tennessee and Kentucky. Lower optimal tilts would indicate the prevalence of more sunny days when the sun is higher in the summer sky.

Figure 13:
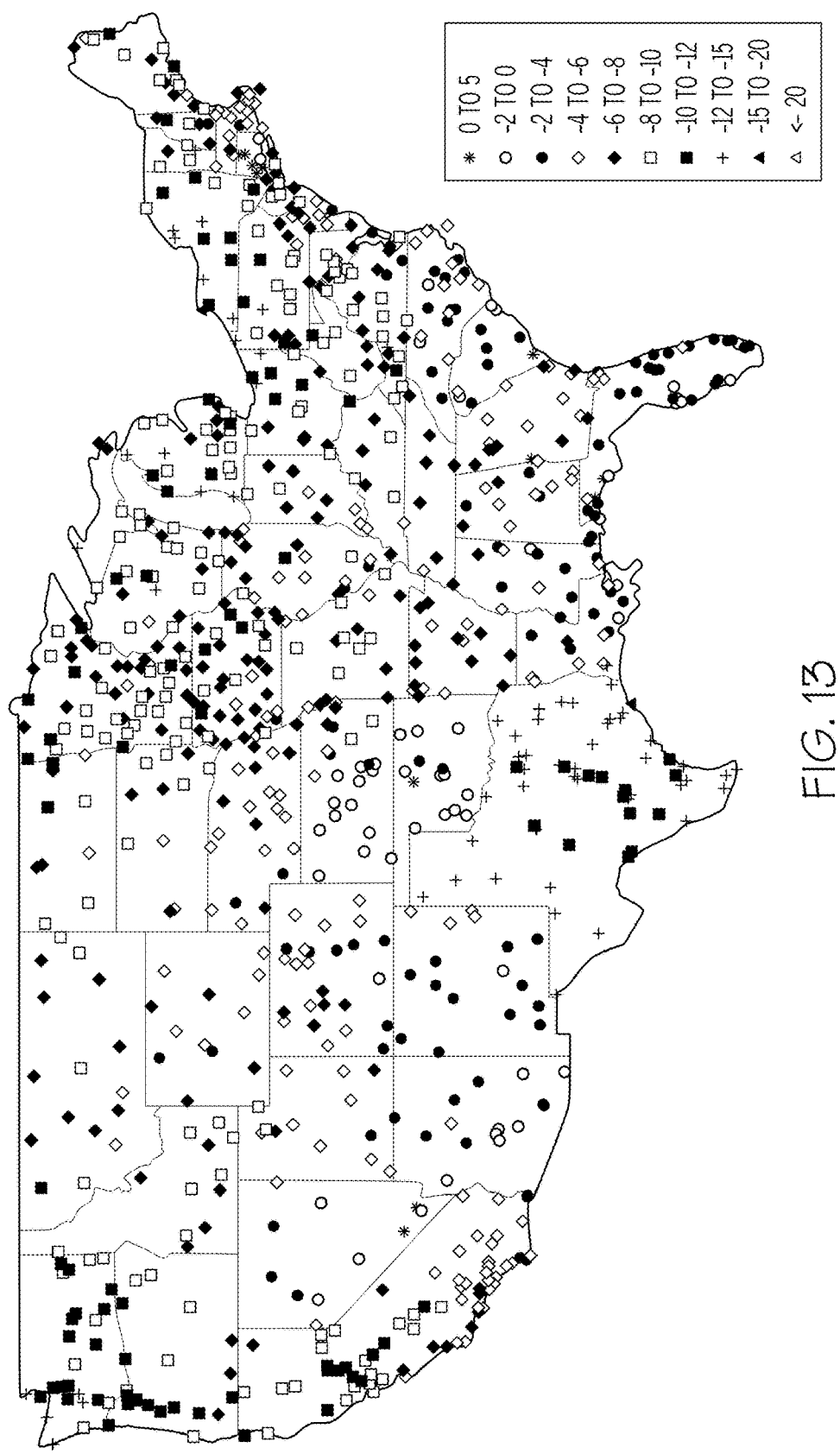
FIG. 13 is a map of continental U.S. showing deviation from the rule of thumb tilt (local latitude) based on the value of local energy production using electric utility rates local to the solar arrays in accordance with an embodiment of the present invention.

FIG. 13 shows a map of the deviation from the rule of thumb tilts as determined by the maximum value ($/m²/year based on local TOU electric rates) of the solar energy produced. FIG. 13 is a map of continental U.S. showing deviation from the rule of thumb tilt (local latitude) based on the value of local energy production in accordance with an embodiment of the present invention. Negative values means that the optimal tilt is below the local latitude.

FIGS. 12 and 13 are very similar, except in situations where the local rates incentivize either more summer or winter production. For example, in California, high summer afternoon electricity prices force the optimal tilt lower to produce more during the summer peak.

To understand how solar PV systems should be placed if the goal were to generate as many kWh during summer peak hours as possible, the analysis was run again where the value of solar was only considered during the afternoon summer hours. This portion of the analysis restricted the time of interest to June through August, and between 14:00 to 20:00—a time period typically associated with high electric grid stress times and higher wholesale electricity prices. For Austin, as well as for most of the U.S., the optimal peak array placement was shifted due west. The average peak optimal azimuth was 266° with a standard deviation of 6.4° and the average optimal peak tilt was 51° with a standard deviation of 4.6°. FIGS. 14A-14B are plots that show the average generation curves for various solar placements in Austin using TMY data, including optimal peak placement in accordance with an embodiment of the present invention.

FIG. 14A shows the generation curves for the entire year and FIG. 14B shows the curves for only the summer months (June-August).

FIG. 15 is a table (Table 2) that summarizes the differences in energy produced (area under the curves) from the placements shown in FIGS. 14A-14B in accordance with an embodiment of the present invention. In particular, Table 2 illustrates the percent change in the amount of energy generated by various solar PV placements as compared to a south facing) (180°/30° array for an entire year, only the summer months (July-August), and for just the peak hours during the summer months (14:00-20:00) for Austin, Tex.

For Austin, the optimal energy and optimal value placements do not differ much from south placements in terms of energy use. However, west facing and optimal peak placement generate about 14 and 20% less energy throughout the year. In the summer, the optimal energy, optimal value, and the west-facing array generate about the same amount of energy as the south facing array with the optimal peak array generating less. During the summer peak demand hours, all placements generate more energy than south-facing arrays with west and optimal peak placements generate 23 and 24% more energy during peak hours, respectfully.

This analysis considers the effect of various placements (azimuth and tilt) of solar PV systems on energy generation and value of that energy generation for a yearly period with various environmental and economic inputs in Austin, Tex. and many locations across the U.S. Furthermore, this analysis extends the body of knowledge by considering the AC electricity produced from a typical solar PV system and by considering electricity prices on a national scale. These results show how local electricity markets (as seen through TOU prices) affect the economic value of solar placement on a national level.

These results have the potential to be significant for solar PV installations. However, the definition of optimal solar PV placement (especially the optimal economic placement) might vary based on whom the definition is asked. Large ground-mounted and at roof arrays that require fixtures could possibly take advantage of an optimal placement (or perceived future optimal placement) at little to no additional cost than due south installations. For a building of fixed orientation, a cost-benefit analysis would have to consider possible less capacity (due to solar PV installations not being aligned with the building lines) verses temporal generation revenue. Utilities can encourage this optimal placement (which could be further west than arrays designed to maximize energy production) by structuring rates that offset their highest wholesale cost times and net-metering or similarly through a "time-of-production" buying rate for solar energy production. Also, these results could be used to influence roof azimuth and pitch in new construction or retrofits to maximize the ability of installed solar PV systems to generate energy.

While the solar tilt rule-of-thumb for total energy production might be a good approximation for most of the U.S., it does not apply everywhere. Notable examples include some locations east of the front range (Rocky Mountains) and the majority of the west coast. Using local TOU electricity rates as a proxy for local grid conditions further changes the optimal tilt. In many locations, the optimal tilt is shifted down, particularly in locations that have TOU rates with higher summer afternoon prices. Although in some cases, rates shift the tilt steeper—particularly in places where TOU rates are high in winter times.

In Austin, Tex. (for total energy production), TMY data indicate an 8° shift west (188°) and a few degrees towards the horizontal (from the rule-of-thumb 30°) might be a better azimuth and tilt for energy production. Clear sky radiation data reinforce the energy rule-of-thumb as expected. Considering the value of energy produced, the optimal azimuth was pushed further west (approximately 20-51°) based on wholesale electricity market prices that are typically higher in the mid to late afternoon hours. While the resulting improvements might seem small, (<1-7% difference), the improvement could be free to implement during construction, and over the 25 year lifespan the excess energy produced and revenue earned could be significant.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for optimally placing photovoltaic arrays to maximize a value of energy production, the method comprising:

automatically varying an azimuth and a tilt combination for each of a plurality of placements for said photovoltaic arrays;

calculating incident solar radiation on a plane based on meteorological, astronomical and geographic data for each of said varied azimuth and tilt for each of said plurality of placements for said photovoltaic arrays;

estimating alternating current solar photovoltaic electric energy and power production from said calculated solar radiation for each of said varied azimuth and tilt using a solar photovoltaic energy production model, wherein said solar photovoltaic energy production model utilizes an efficiency of photovoltaic panels, an efficiency of a solar inverter, an incident radiation on a tilted plane, an ambient temperature, a reference temperature of photovoltaic panels, a nominal operating cell temperature at operating test conditions and a temperature coefficient of photovoltaic panels;

calculating, by a processor, an economic and non-economic value of solar photovoltaic electric energy and power produced by said photovoltaic arrays for said plurality of placements using said estimated alternating current solar photovoltaic electric energy and power production;

generating a heat map of said calculated incident solar radiation and said estimated photovoltaic electric energy and power production;

selecting an optimized azimuth and tilt corresponding to a placement out of said plurality of placements for said photovoltaic arrays corresponding to a highest value of said solar photovoltaic electric energy and power produced by said photovoltaic arrays based at least in part on said heat map; and placing said photovoltaic arrays on a surface using said selected optimized placement.

2. The method as recited in claim 1, wherein said incident solar radiation comprises beam radiation, radiation diffused from the sky and radiation reflected from the ground.

3. The method as recited in claim 1, wherein said estimate of said alternating current solar photovoltaic electricity production is based on meteorological and astronomical conditions.

4. The method as recited in claim 1, wherein said economic and non-economic value of solar photovoltaic electric energy and power produced by said photovoltaic arrays for said plurality of placements is calculated using a second model, wherein said second model comprises calculating solar radiation on a plane based on a placement and horizontal solar radiation values, calculating energy produced at said placement using said solar photovoltaic energy production model, and calculating value of energy produced using either local market conditions or local utility rates.

5. The method as recited in claim 1 further comprising:

calculating said economic and non-economic value of said solar photovoltaic electric energy and power produced by said photovoltaic arrays for said plurality of placements using said estimated alternating current solar photovoltaic electric energy and power production, weather data and local market conditions or local utility rates.

6. A computer program product for optimally placing photovoltaic arrays to maximize a value of energy production, the computer program product comprising a computer readable storage medium having program code embodied therewith, the program code comprising the programming instructions for:

automatically varying an azimuth and a tilt combination for each of a plurality of placements for said photovoltaic arrays;

calculating incident solar radiation on a plane based on meteorological, astronomical and geographic data for each of said varied azimuth and tilt for each of said plurality of placements for said photovoltaic arrays;

estimating alternating current solar photovoltaic electric energy and power production from said calculated solar radiation for each of said varied azimuth and tilt using a solar photovoltaic energy production model, wherein said solar photovoltaic energy production model utilizes an efficiency of photovoltaic panels, an efficiency of a solar inverter, an incident radiation on a tilted plane, an ambient temperature, a reference temperature of photovoltaic panels, a nominal operating cell temperature at operating test conditions and a temperature coefficient of photovoltaic panels;

calculating an economic and non-economic value of solar photovoltaic electric energy and power produced by said photovoltaic arrays for said plurality of placements using said estimated alternating current solar photovoltaic electric energy and power production;

generating a heat map of said calculated incident solar radiation and said estimated photovoltaic electric energy and power production; and selecting an optimized azimuth and tilt corresponding to a placement out of said plurality of placements for said photovoltaic arrays corresponding to a highest value of said solar photovoltaic electric energy and power produced by said photovoltaic arrays based at least in part on said heat map, wherein said photovoltaic arrays are placed on a surface using said selected optimized placement.

7. The computer program product as recited in claim 6, wherein said incident solar radiation comprises beam radiation, radiation diffused from the sky and radiation reflected from the ground.

8. The computer program product as recited in claim 6, wherein said estimate of said alternating current solar photovoltaic electricity production is based on meteorological and astronomical conditions.

9. The computer program product as recited in claim 6, wherein said economic and non-economic value of solar photovoltaic electric energy and power produced by said photovoltaic arrays for said plurality of placements is calculated using a second model, wherein said second model comprises calculating solar radiation on a plane based on a placement and horizontal solar radiation values, calculating energy produced at said placement using said solar photovoltaic energy production model, and calculating value of energy produced using either local market conditions or local utility rates.

10. The computer program product as recited in claim 6, wherein the program code further comprises the programming instructions for:

calculating said economic and non-economic value of said solar photovoltaic electric energy and power produced by said photovoltaic arrays for said plurality of placements using said estimated alternating current solar photovoltaic electric energy and power production, weather data and local market conditions or local utility rates.

11. A system, comprising:

a memory unit for storing a computer program for optimally placing photovoltaic arrays to maximize a value of energy production; and a processor coupled to the memory unit, wherein the processor is configured to execute the program instructions of the computer program comprising:

automatically varying an azimuth and a tilt combination for each of a plurality of placements for said photovoltaic arrays;

calculating incident solar radiation on a plane based on meteorological, astronomical and geographic data for each of said varied azimuth and tilt for each of said plurality of placements for said photovoltaic arrays;

estimating alternating current solar photovoltaic electric energy and power production from said calculated solar radiation for each of said varied azimuth and tilt using a solar photovoltaic energy production model, wherein said solar photovoltaic energy production model utilizes an efficiency of photovoltaic panels, an efficiency of a solar inverter, an incident radiation on a tilted plane, an ambient temperature, a reference temperature of photovoltaic panels, a nominal operating cell temperature at operating test conditions and a temperature coefficient of photovoltaic panels;

calculating an economic and non-economic value of solar photovoltaic electric energy and power produced by said photovoltaic arrays for said plurality of placements using said estimated alternating current solar photovoltaic electric energy and power production;

generating a heat map of said calculated incident solar radiation and said estimated photovoltaic electric energy and power production; and selecting an optimized azimuth and tilt corresponding to a placement out of said plurality of placements for said photovoltaic arrays corresponding to a highest value of said solar photovoltaic electric energy and power produced by said photovoltaic arrays based at least in part on said heat map, wherein said photovoltaic arrays are placed on a surface using said selected optimized placement.

12. The system as recited in claim 11, wherein said incident solar radiation comprises beam radiation, radiation diffused from the sky and radiation reflected from the ground.

13. The system as recited in claim 11, wherein said estimate of said alternating current solar photovoltaic electricity production is based on meteorological and astronomical conditions.

14. The system as recited in claim 11, wherein said economic and non-economic value of solar photovoltaic electric energy and power produced by said photovoltaic arrays for said plurality of placements is calculated using a second model, wherein said second model comprises calculating solar radiation on a plane based on a placement and horizontal solar radiation values, calculating energy produced at said placement using said solar photovoltaic energy production model, and calculating value of energy produced using either local market conditions or local utility rates.

15. The system as recited in claim 11, wherein the program instructions of the computer program further comprises:

calculating said economic and non-economic value of said solar photovoltaic electric energy and power produced by said photovoltaic arrays for said plurality of placements using said estimated alternating current solar photovoltaic electric energy and power production, weather data and local market conditions or local utility rates.

* * * * *